June 4, 1963 R. K. WOODRUFF 3,092,247
REFRACTORY-FORMING PRODUCTS
Filed Oct. 11, 1960
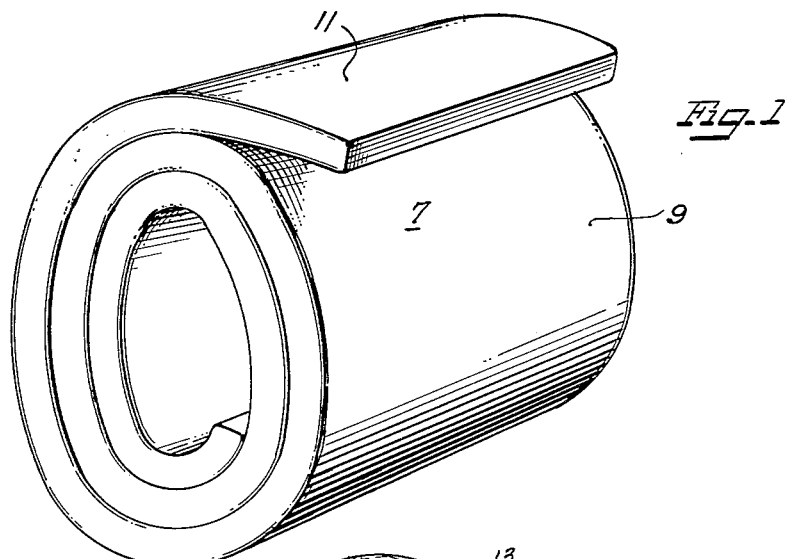
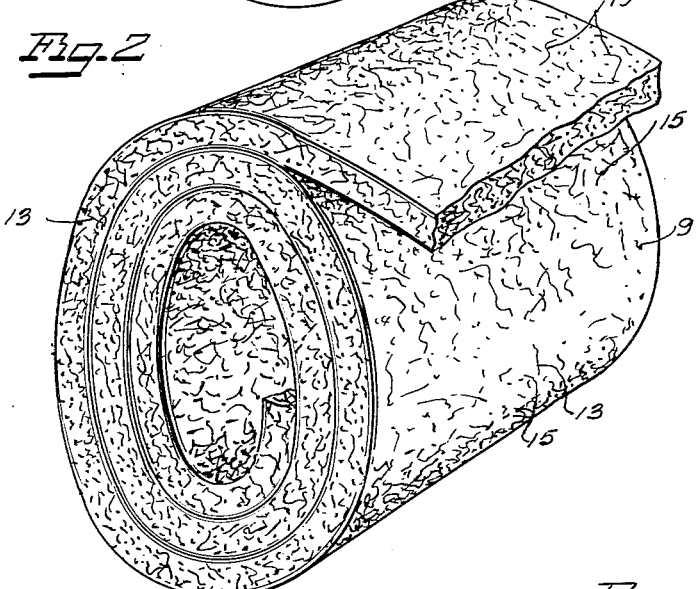
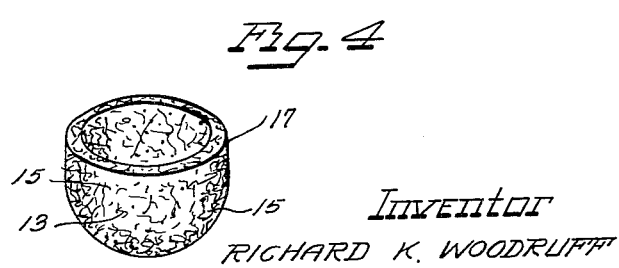
Inventor
RICHARD K. WOODRUFF
By Soans, Anderson, Luedeka & Fitch
Attys United States Patent Office 3,092,247
Patented June 4, 1963

3,092,247
REFRACTORY-FORMING PRODUCTS
Richard K. Woodruff, Dundee, Ill., assignor to Refractory Products Company, Chicago, Ill., a corporation of Illinois
Filed Oct. 11, 1960, Ser. No. 61,967
2 Claims. (Cl. 206—46)

The present invention generally relates to refractory-forming materials, and more particularly relates to moldable refractory-forming mats and units containing the same.

Various types of refractory products have special value in high temperature applications due to their inherent stability, structural strength and other desirable properties. Accordingly, they can be utilized in the fabrication of molded containers, receptacles, and other handling equipment for metal, such as aluminum, in the molten state, and other high temperature materials. Moreover, refractory products can also be effectively empolyed as molded protective insulators or casings for valves, pipes, etc.

Refractory products are conventionally formed at high temperatures and/or pressures in special molds. Thus, for example, if it is desired to produce a lining for a ladle or a protective insulating jacket for a steel valve or the like, it is conventional to first form a mold to the shape desired for the finished refractory lining or jacket. Thereafter, refractory-forming material is usually introduced into the mold as a wet mat and is formed by pressure and/or heat into the desired product.

Obviously, it would be desirable to provide a simple effective way of forming refractory products of pre-determined shapes at relatively low temperatures and pressure and without the use of special molds. Furthermore, it would also be desirable to provide the refractory-forming material in a form which would not require preliminary preparation or subsequent firing.

Accordingly, it is the principal object of the present invention to provide improved refractory-forming materials. It is also an object of the present invention to provide refractory-forming materials capable of being converted into finished refractory products without requiring conventional refractory molding apparatus, high temperatures and/or pressures. It is a further object of the present invention to provide refractory-forming materials in a convenient, inexpensive form which obviates preliminary conventional treating steps before molding to the desired form.

Further objects and advantages of the present invention are set forth in the following detailed description and in the accompanying drawings, of which:

FIGURE 1 is a perspective view of a preferred embodiment of a refractory-forming unit comprising a refactory-forming mat enclosed within a protective envelope;

FIGURE 2 is a perspective view of the mat of FIGURE 1, with the envelope removed therefrom;

FIGURE 3 is an enlarged fragmentary view of a portion of the refractory-forming mat of FIGURE 1; and, FIGURE 4 is a perspective view of a receptacle formed in accordance with the present invention from a portion of the mat of FIGURE 2.

The present invention generally comprises a unit which includes a refractory-forming mat capable of being molded to desired shape without necessitating the use of a conventional refractory mold. The object formed from the mat can be set without necessitating the use of high temperatures and/or pressures. More specifically, the mat is enclosed within a protective barrier or envelope which maintains the mat in suitable condition for use, even over an extended period of time. The mat can be easily removed from the envelope when it is desired to convert the mat into a finished hardened refractory product of desired shape.

Referring more particularly to FIGURE 1 of the accompanying drawings, FIGURE 1 illustrates a refractory-forming unit 7 comprising a refractory-forming mat 9, shown more particularly in FIGURE 2, which mat is enclosed and sealed within a protective barrier or envelope 11. The mat 9 comprises a mass of refractory fibers 13 mixed with a suitable moldable hardenable binder 15. The fibers 13 may be of any desired length and size, depending upon the use to which the mat may be put.

The refractory fibers may be formed of any suitable refractory-forming materials, naturally occurring or synthetic. Thus, mineral wool, asbestos, fiberglass, alumina, beryllia, zirconia, titania, slag wool, quartz and the like inorganic materials can be used when formed into fibers. Mixtures of such fibers are also suitable for the present purposes. For example, glass can be extruded in the form of long, thin threads and sliced to desired lengths, then mixed with asbestos fibers for use in forming the desired mat 9.

Preferably, the fibers are sufficiently long, so as to readily intertwine to form a coherent mass or mat. They may be any suitable diameter, for example, of from less than about 1 micron on up. However, the present invention is not limited to fibers of any particular size.

The refractory fibers 13 should be capable of withstanding high temperatures and should also be capable of being readily bonded together through the use of a selected organic and/or inorganic hardenable binder material. The fibers 13 are preferably disposed in random fashion throughout the mat 9, as illustrated in FIGURE 3, so as to readily form a coherent mass.

As illustrated in FIGURE 2, the moldable, hardenable binder 15 for the fibers is dispersed throughout the mat and interposed between and disposed on the plurality of fibers. The binder 15 may aid in holding the fibers in a coherent mass, even before it is set to a hardened state during formation of the desired refractory product. Such binder may be organic or inorganic, or a mixture of both types. Preferably, a sufficient amount of inorganic binder is present in the mat so that when a finished refractory product is formed from the mat, the product will be temperature stable during normal high temperature use of the refractory product.

Colloidal silica has been found to be a particularly suitable inorganic binder for the purposes of the present invention. Colloidal silica is an aqueous sol comprising discrete, preferably spherical silicon dioxide (silica) particles charged negatively by incorporating a small amount of alkali therewith. Colloidal silica is commercially available, one such product being marketed under the registered trademark "Ludox Colloidal Silica," manufactured and sold by Du Pont de Nemours and Co., Wilmington, Delaware.

The moldable, hardenable binder also may be any other suitable inorganic material capable of binding the plurality of refractory fibers into a form-retaining refractory product of desired shape, for example, sodium silicate, colloidal alumina, colloidal zirconia, etc.

An organic, hardenable binder may be used in addition to or instead of the inorganic binder. Thus, any suitable natural or proteinaceous adhesive, such as casein, animal glue, zein, dextrin, shellac, asphalt and the like adhesives, some of which are soluble or dispersible in water, may be used. Instead, a synthetic binder, such as a urea-formaldehyde, phenol-formaldehyde, melamine-formaldehyde, resorcinol-formaldehyde, vinyl polymers, cellulose derivatives, acrylic resins, polyesters, epoxy compounds and elastomers, dissolved in, dispersed in or softened by the presence of a suitable solvent, dispersing medium or softener may be used. Evaporation of the solvent, dispersing medium, softener, etc. (with or without catalyst, selected temperature, etc.) sets the resin. However, the solvent, dispersing medium or softener should be selected so as not to adversely affect the refractory fibers 13 of the mat or the envelope 11.

For example, water is a solvent or dispersant for such adhesives as polyvinyl alcohol, urea resins, some vinyl resins, alkyd resins, methyl cellulose, melamine resins, some phenolic resins, resorcinol resins, styrene resins, and the like.

Chlorinated hydrocarbons, such as trichlorethylene and carbon tetrachloride, are solvents and dispersing agents for such adhesives as rubbers, vinyl acetate, ethyl methacrylate, furan resins and waxes such as paraffin, microcrystalline wax, etc. Alcohols and aromatic hydrocarbons are also suitable solvents for certain organic binders. Water is suitable for use as a solvent in the presence of refractory fibers and most synthetic envelopes. Trichlorethylene and carbon tetrachloride are also suitable for use with most refractory fibers and certain synthetic envelopes.

It is within the skill of one versed in the art to select a suitable organic binder of the type described and capable of binding together the refractory fibers 13 to form the desired refractory product, the binder and the solvent, dispersing medium or softener for which do not adversely affect the fibers 13 and envelope 11.

An organic binder can be selected which is capable of being polymerized to a hardened state by heat, catalyst, etc. and which does not solely depend upon loss of solvent, dispersant, softener, etc. to set.

Thus, the thermosetting urea-formaldehyde resins, melamine resins and phenol-formaldehyde resins can be advantageously employed as the binder 15. Whatever the type of binder used, it must be, in accordance with the present invention, maintained in the mat in a state which allows it to be readily molded with the fibers of the mat, and then subsequently hardened so as to cause the mat to retain its molded shape to form the desired refractory product.

It will be understood that if an inorganic binder is not employed in a substantial proportion in the mat, the finished ceramic product formed from the mat will be capable of retaining its shape and form only at temperatures and under other conditions which do not result in deterioration or breakdown of the organic binder.

Although a relatively thin mat of extended surface area is illustrated in the accompanying drawings, it is also within the scope of the present invention to provide a mat of other configuration or construction formed of the plurality of refractory fibers 13, in accordance with known web-and-mat-forming techniques.

As an example of a typical mat-forming procedure, a 10 percent by weight slurry of refractory fibers disposed within a suitable slurry-forming medium, water, can be passed onto the top surface of a mat-forming wire screen or the like which is provided with a plurality of openings down through which the slurry-forming medium may readily pass while the fibers accumulate on such top surface of the mat-forming screen. Vacuum may be applied to the underside of the screen to speed mat formation and facilitate removal of the slurry-forming medium. The slurry-forming medium should be compatible with the refractory fibers 13, with the binder 15, binder solvent, dispersing medium, softener, etc. and the envelope 11.

The binder may be introduced into the mat during or after formation of the mat and in any suitable manner. For example, the binder may be dissolved in a solvent therefor and the mat of fibers can then be contacted with the binder-solvent mixture, as by soaking the mat therein, pouring the binder-solvent mixture onto the mat, spraying the mat therewith, etc. Alternatively, the binder-solvent mixture can be added to the mat-forming fiber slurry, so that the fibers are intimately contacted therewith before formation of the mat. At any rate, the binder must be distributed uniformly throughout the mass of fibers forming the mat in a concentration sufficient to be effective in ultimately bonding together the mat during formation of the desired finished, hardened, molded refractory product.

Obviously, the concentration of binder will greatly vary, depending upon the fibers, binder, intended use of the mat and a number of other factors. However, it has been found that a concentration of approximately 5 percent binder, exclusive of solvent, in the mat, on a dry fiber weight basis, is usually sufficient for the purposes of the present invention.

In accordance with the present invention, the mat containing the moldable, hardenable binder must be maintained in the moldable condition until it is desired to use the mat to form a refractory product. Thus, the binder must be protected so that it does not set up, become hardened and render the mat unmoldable. Accordingly, the binder is maintained in the desired state by enclosing the mat in the envelope 11 which acts as a vapor barrier. The envelope 11 may be any suitable material, preferably a thin flexible film, so that the mat can be readily rolled up, as illustrated in FIGURE 1, for convenient storage in a small space.

The envelope 11 is disposed around the mat 9 to wholly enclose the mat and seal it from the atmosphere. For this purpose, it has been found that various types of extended plastic films, such as polyethylene, cellulose acetate, regenerated cellulose (cellophane), polystyrene, polyvinyl chloride, rubber hydrochloride, polyvinylidene chloride, methyl methacrylate, and similar films have the desired flexibility and vapor-barrier characteristics. However, many metal foils, fiber sheets, etc., can be also used as the envelope 11. No matter what material is used, it should be capable of acting as an effective barrier against passage of gases and moisture into contact with the mat 9.

Thus, the envelope 11 prevents or inhibits removal of volatilizable solvents, dispersing media, softeners, etc., from contact with the binder in the mat, and also prevents contacting of the mat with air and other gases which have a tendency to promote polymerization of various types of organic binders. An envelope 11 may be selected which acts to some extent as a heat barrier for those binders settable by heat, i.e., aluminum foil or the like may be used as the envelope under such circumstances. If the binder is one which is dissolved in water, it will be important to provide an envelope which prevents the evaporation of water from the mat.

In view of the foregoing, it will be obvious to one skilled in the art to select suitable materials for use as envelopes or vapor barriers according to the type of binder and solvent used in the mat 9. The envelope 11 should, as previously indicated, be selected so that it is unaffected by the binder and also the solvent, dispersing medium, softener, etc., associated with the binder in the mat.

As an example of a suitable combination of envelope and mat, a mat comprising a plurality of interfelted fibers comprised predominantly of alumina and silica, with small amounts of borate and sodium oxide present, and mixed with colloidal silica binder can be enclosed within an open polyethylene envelope which can then be taped shut in an air-tight manner. If desired, casein or other protein adhesive dissolved in water could be substituted for the colloidal silica. Loss of water from the colloidal silica binder in the mat is prevented by the polyethylene envelope. Accordingly, the mat does not harden before it is removed from the envelope and used.

When it is desired to form a molded refractory product, such as the cup 17 illustrated in FIGURE 4, the mat is removed from the envelope, and is then shaped to the desired form. For example, since the mat is readily deformable, it can be placed as a lining for a steel ladle and shaped to conform to the inner surface of the ladle. The mat is retained in position until the binder hardens, and the mat thereby is converted to finished form. An optional but desirable step comprises wetting the hardened mat with additional binder in solution, dispersing medium, etc., to further assure permanent form retention by the refractory product. Thereupon, the product is redried in the previously indicated manner.

If the binder is, for example, colloidal silica, heat can be applied to the ladle and, consequently, to the mat to remove water from the colloidal silica, hardening and drying the mat to a form-retaining shape conforming to the inner surface of the ladle. Thereafter, the mat can, if desired, be readily withdrawn from the ladle. The mat can be provided in any desired thickness, length and width and can be readily cut to a particular size before molding around or within a shape-imparting component. Accordingly, there is no necessity of inserting the mat in a conventional ceramic-forming mold or die, employing pressure, etc. in order to produce a molded refractory product.

It will be understood that although the preceding description is directed to a mat of extended surface area, other arrangements of the described fiber-hardenable binder mixture are also contemplated. As previously indicated, the manner of setting up the binder and therefore hardening the mat to its finished shape-retaining molded form will depend upon the type of binder, the uses to which the desired finished product are to be put, etc. In most instances, mild application of heat and exposure to air are sufficient to dry out the mat and set up the binder to a hardened state within a reasonable amount of time. In the case of inorganic binders, higher temperatures above the combustion point of organic binders can usually be employed to speed the operation.

Various of the features of the present invention are set forth in the following examples:

*Example I*

A refractory fiber mat is formed from fibers sold under the trademark Fiberfrax and manufactured by the Carborundum Company. Each of the fibers comprises approximately 51.2 percent alumina, 47.4 percent silica and 0.7 percent of boron oxide and sodium oxide, with a fiber length of up to 1.5 inches and an average fiber diameter of about 2.5 microns. The fibers weigh 2 pounds per cubic foot, and are stable up to about 2,300° F. The Fiberfrax fibers are dispersed in a 5 percent by weight concentration in water to form a slurry. The slurry also contains approximately 22 percent by weight of solids of colloidal silica introduced into the slurry water by a suitable amount of a commercial colloidal silica preparation containing approximately 30 percent solids and 70 percent water.

The slurry is disposed in a tank into which is inserted a porous felting screen, the underside of which is connected to a vacuum suction box. The fibers accumulate on the top surface of the screen to form a mat. When the mat is approximately ⅛ inch thick, the screen is withdrawn from the tank, but suction is maintained until the water content of the mat drops to about 20 percent by weight, and the colloidal silica content of the mat is about 5 percent by weight, on a solids basis. Thereafter, the mat is removed from the screen, and enclosed within a rubber hydrochloride bag which is then sealed shut around the mat so that the mat is protected from loss of moisture and from contact with air.

The resulting unit is subsequently opened and the mat is removed and cut into pieces of appropriate size which are wound around the outside of steel crucibles of appropriate size and shape. The pieces of mat forming each crucible readily adhere together, particularly when they are dried for ½ hour at a temperature of approximately 500° F. in a stream of hot air. Thereupon, the steel crucibles are removed, and shape-retaining molded refractory crucibles suitable for use in high temperature applications are thereby provided.

*Example II*

A moldable refractory-forming mat is formed on a felting screen in the manner described in Example I from a slurry which contains no binder, but contains a mixture of fiberglass fibers, beryllia fibers and asbestos fibers in approximately equal proportions by weight, said fibers being up to about 1 inch in length and approximately 50 microns in average diameter. The formed mat is ½ inch thick. It is stripped from the felting screen and soaked in a dispersion comprising polyvinyl acetate adhesive dispersed in trichlorethylene in a tank, so that the ultimate binder concentration in the mat, on a solids weight basis, is approximately 5 percent by weight. The wet mat containing the binder is then drained of excess moisture and sealed in aluminum foil to prevent loss of trichlorethylene therefrom.

The resulting unit is then stored for a period of one month, after which it is removed from the envelope, cut into suitable lengths with a knife and the lengths are wrapped tightly around a series of steel valves, conforming to the shape of the valves. Each length of mat is heated in place on the respective valve at about 180° F. for about 1 hour, that is, until dry. At the end of this time, the binder in the mat has set so that the mat has been converted to a hardened finished refractory product of shape-retaining form, disposed closely around each valve as a protective casing.

Molded refractory products formed in accordance with the foregoing have a wide variety of applications. For example, it has been found that refractory products prepared from such mats are highly satisfactory for equipment in aluminum manufacture. Thus, pouring troughs for aluminum reverberation furnaces and combustion chambers for oil heaters can be readily fabricated from the described unit. Such products can be made to withstand temperatures of over 2,000° F., and resist flame impingement, spalling and shrinkage. They can be readily sawed, drilled and sanded. Moreover, they are not wet by molten aluminum and are effective insulators. Tubes, cylinders, pouring basins, pouring spouts, floats, and various other products of any desired size and shape can be readily fabricated from the mats.

Accordingly, improved refractory-forming mats and units containing the same are provided which are inexpensive, simple and of increased utility. They can be formed at low temperature into desired refractories without utilizing conventional refractory molding equipment. Other advantages thereof are set forth in the foregoing.

Various of the features of the present invention are set forth in the appended claims.

What is claimed is:

1. A refractory-forming unit which comprises a moldable refractory-forming mat and an envelope loosely sealed around said mat in vapor-tight relation thereto, said mat comprising a plurality of felted refractory fibers including alumina fibers and an unset liquid binder including a high temperature-stable inorganic material, which binder maintains said fibers in a coherent mass and upon setting holds said mat in a fixed shape at up to including refractory temperatures whereby a portion of said mat can be easily removed from said envelope and said binder hardened to form a refractory product.

2. A refractory-forming unit which comprises a moldable mat and a non-porous plastic envelope loosely sealed around said mat in vapor-tight relation thereto, said mat comprising a plurality of felted refractory fibers including alumina fibers and an unset binder including colloidal silica, said binder being intermixed with said fibers so as to maintain said fibers in a coherent mass, and said binder after setting maintaining said mat in a fixed shape at heats up to refractory temperatures, whereby said mat can be removed from said envelope and said binder set to form a refractory product.

(References on following page)

References Cited in the file of this patent

UNITED STATES PATENTS

| | | |
|---|---|---|
| 2,444,347 | Greger et al. | June 29, 1948 |
| 2,459,164 | Holst et al. | Jan. 18, 1949 |
| 2,489,985 | Speight | Nov. 29, 1949 |
| 2,597,872 | Iler | May 27, 1952 |
| 2,701,054 | Howald et al. | Feb. 1, 1955 |
| 2,705,557 | Hartman | Apr. 5, 1955 |
| 2,748,028 | Richardson | May 29, 1956 |
| 2,782,465 | Palmer | Feb. 26, 1957 |
| 2,940,196 | Schor | June 14, 1960 |
| 3,024,145 | Nickerson | Mar. 6, 1962 |